United States Patent
Lubkert et al.

(10) Patent No.: US 6,885,796 B2
(45) Date of Patent: Apr. 26, 2005

(54) WORKSURFACE POWER MODULE WITH FIBER OPTIC CAPABILITY

(75) Inventors: Kenneth H. Lubkert, Fort Wayne, IN (US); Brian K. Rupert, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 160 days.

(21) Appl. No.: 10/397,461

(22) Filed: Mar. 26, 2003

(65) Prior Publication Data

US 2003/0185515 A1 Oct. 2, 2003

Related U.S. Application Data

(60) Provisional application No. 60/368,063, filed on Mar. 27, 2002.

(51) Int. Cl.$^7$ .................................................. G02B 6/26
(52) U.S. Cl. ........................ 385/48; 385/147; 385/134; 385/75; 312/223.3; 439/535
(58) Field of Search ..................... 385/48, 75, 88–94, 385/137, 147; 312/223.3; 439/535

(56) References Cited

U.S. PATENT DOCUMENTS

| | | | |
|---|---|---|---|
| 4,705,960 A | 11/1987 | Lovrenich | 307/149 |
| 5,149,277 A * | 9/1992 | LeMaster | 439/207 |
| 5,721,394 A | 2/1998 | Mulks | 174/48 |
| 5,748,456 A | 5/1998 | Bayerer | 261/820 |
| 5,862,324 A | 1/1999 | Collins | 395/200.5 |
| 5,964,618 A | 10/1999 | McCarthy | 439/574 |
| 6,019,321 A | 2/2000 | Carlson, Jr. et al. | 248/49 |
| 6,081,356 A * | 6/2000 | Branc et al. | 398/129 |
| 6,095,698 A | 8/2000 | Sträb et al. | 385/88 |
| 6,175,078 B1 | 1/2001 | Bambardekar et al. | 174/48 |
| 6,243,510 B1 | 6/2001 | Rauch | 385/15 |
| 6,457,874 B1 * | 10/2002 | Clapp et al. | 385/75 |

* cited by examiner

*Primary Examiner*—Akm Enayet Ullah
*Assistant Examiner*—Kevin S. Wood
(74) *Attorney, Agent, or Firm*—Taylor & Aust, P.C.

(57) ABSTRACT

A power and communications assembly including a housing removably mountable to a worksurface, at least one electrical power receptacle at least partially contained in the housing and an optical splitting device configured to split one optical bi-directional signal into a plurality of additional optical bi-directional signals, the optical splitting device substantially within the housing.

19 Claims, 2 Drawing Sheets

WORKSURFACE POWER MODULE WITH FIBER OPTIC CAPABILITY

CROSS REFERENCE TO RELATED APPLICATIONS

This is a non-provisional application based upon U.S. provisional patent application Ser. No. 60/368,063, entitled "WORKSURFACE POWER MODULE WITH FIBER OPTICS CAPABILITIES", filed Mar. 27, 2002.

BACKGROUND OF THE INVENTION

1. Field of the Invention

The present invention relates to a power module mountable on a worksurface and more particularly, to a power module with communications ports mountable to a worksurface.

2. Description of the Related Art

Personal computers have been developed for many applications in many fields, such as medical care, business, education and industry. Due to the diverse applications, there are many peripheral devices, which are developed to cooperate with the personal computer to achieve particular functions. Some of the peripheral devices are connected with the personal computer by way of cables. Some connections utilize Universal Serial Bus (USB) cables, which are becoming quite popular.

As the capability and speed of computers has incresed the demand for faster communication has increased accordingly. The desire for higher speed internet connections has led to satellite connections as a solution. Fiber optics allow high speed broadband communications and are exemplified by passive optical networks, which facilitate the coexistence of broadband available services including cable televisions, telephone operations and data communication. Ethernet passive optical networks provide full communications services including access to networks that deliver converged data, video and voice over a single optical access system. With transmission data rates having been demonstrated of more then 10 trillion bits per second, optical transmissions will inevitably become a major consideration in the planning of inter-office communications. High capacity transmission system are in demand not only for internet access but as all forms of communication in office and homes.

A problem with fiber optic cable is that a sharp bend attenuates or even disable sthe transmission of the signal.

Power strips came into popular use along with the personal computer. Power strips typically have multiple power outlets and a switch to turn at least a portion of the electrical receptacles on and off.

What is needed in the art is device for providing power and fiber optic receptacles in an easily relocatable and attachable configuration.

SUMMARY OF THE INVENTION

The present invention provides a portable power module with a built-in communication port.

The invention comprises, in one form thereof, power and communications assembly including a housing removably mountable to a worksurface, at least one electrical power receptacle at least partially contained in the housing and an optical splitting device configured to split one optical bi-directional signal into a plurality of additional optical bi-directional signals, the optical splitting device substantially within the housing.

An advantage of the present invention is that it provides convenient fiber optic connection ports.

Another advantage of the present invention is that it makes fiber optic connection points easily accessible by placing them in a location on a worksurface rather than behind a CPU, on a wall or floor distribution port.

Yet another advantage of the present invention is that electrical power and fiber optic connections are available in the same device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
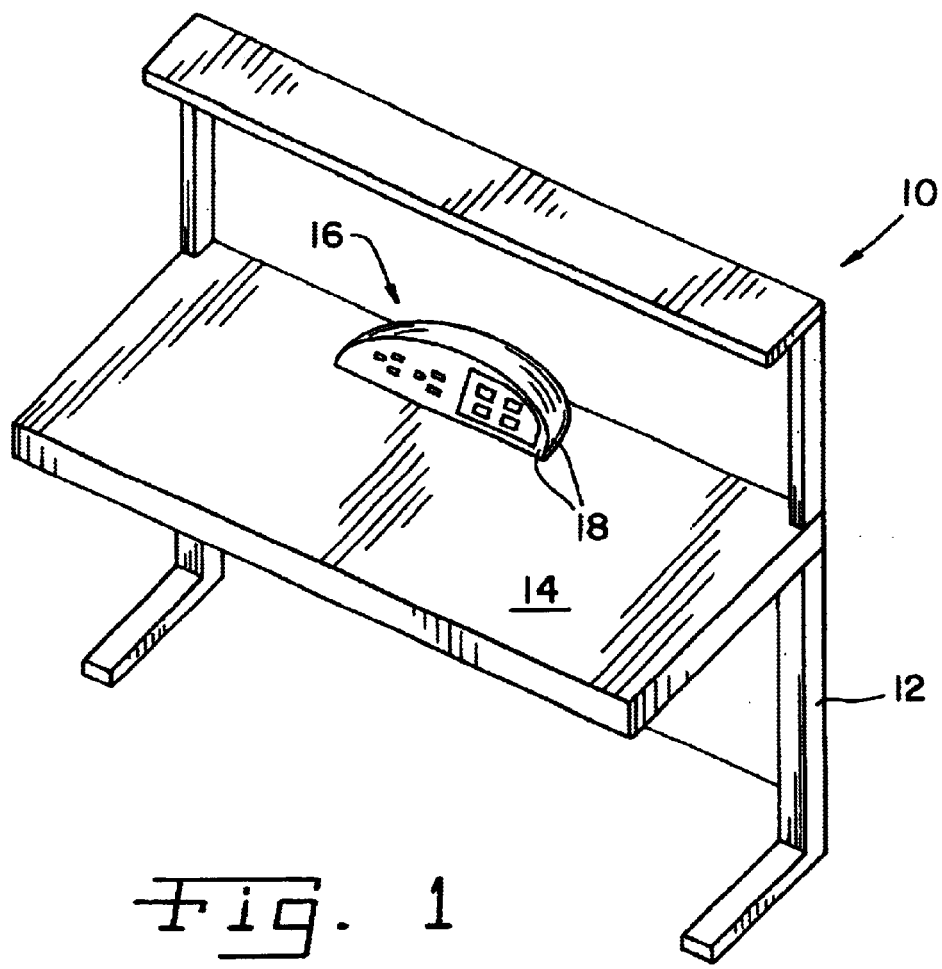
FIG. 1 is a perspective view of an embodiment of a power module with a built-in fiber optic capability mounted on a work center according to one form of the invention.

Referring now to the drawings, and more particularly to FIG. 1, there is shown a work center 10 having a support 12 and a worksurface 14. Power/communications module 16 is mounted upon worksurface 14.

Figure 3:
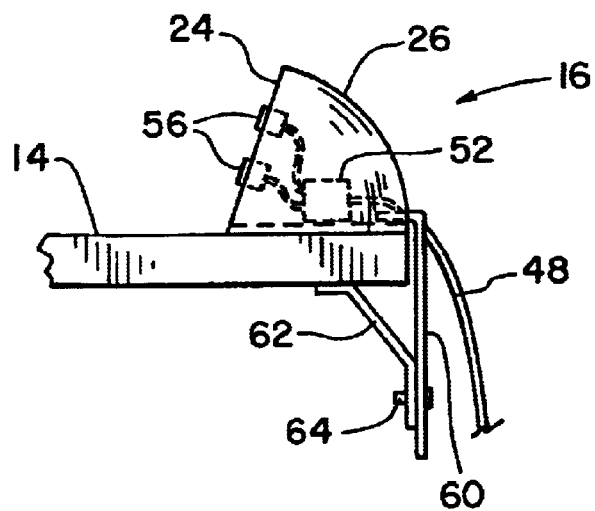
FIG. 3 is a partial cross-section view of the power module with a built in fiber optic capability of FIGS. 1 and 2 mounted to worksurface.
Figure 2:
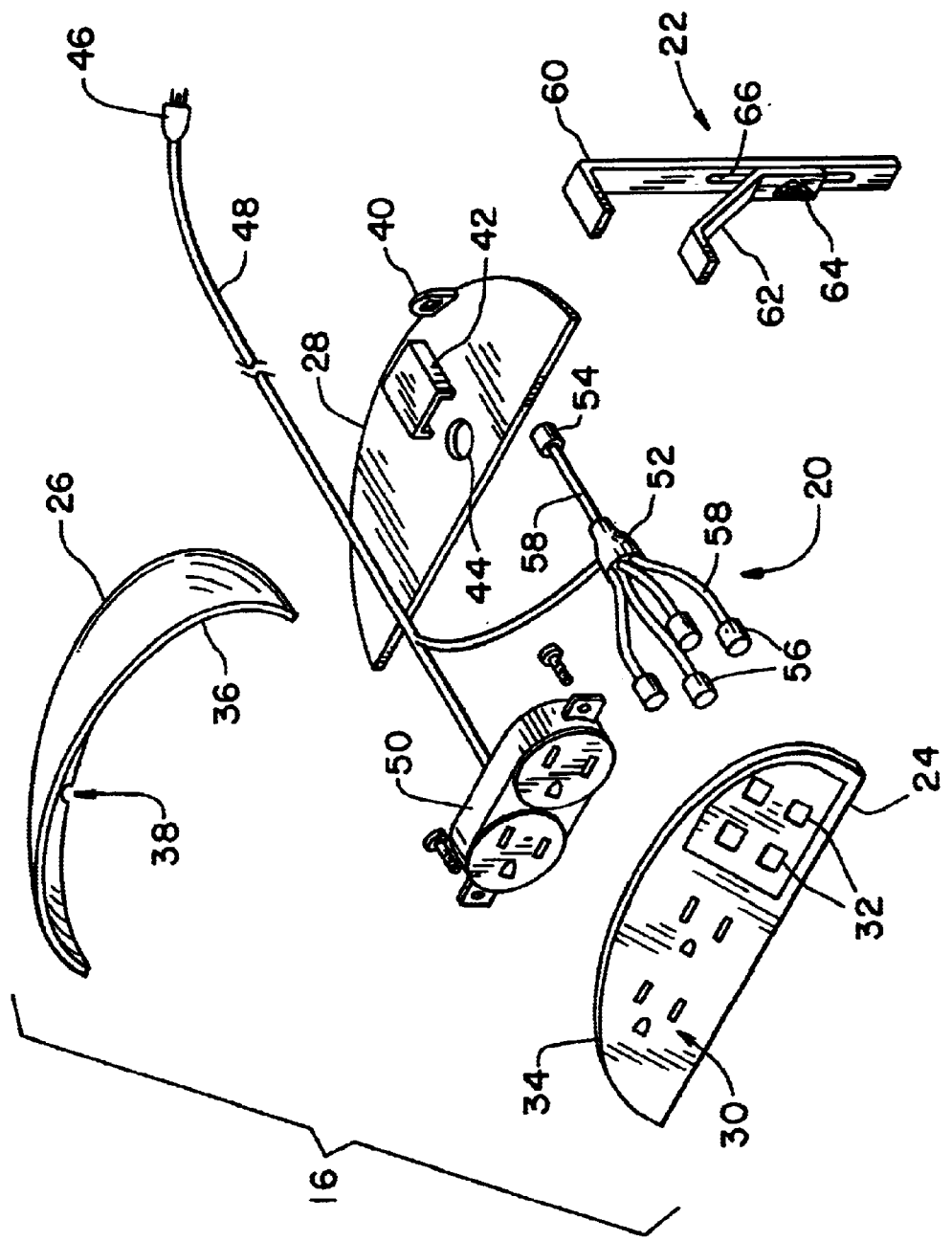
FIG. 2 is a perspective exploded view of the power module with a built in fiber optic capability of FIG. 1.

Now, additionally referring to FIGS. 2 and 3, there is shown power/communications module 16 having housing 18, a power/communications assembly 20 and a clamping device 22. Housing 18 includes a face plate 24, a cover 26 and a lower housing 28. Face plate 24, cover 26 and lower housing 28 are snapped together or held together with fasteners.

Face plate 24 includes power distribution openings 30, communication connection openings 32 and contoured surface 34. Power distribution openings 30 accommodate a power receptacle to thereby allow a power plug to be plugged into and through power distribution openings 30 into an electrical receptacle. Communication connection openings 32 are positioned and sized to accommodate communications connectors that may be snapped into place therethrough. Contoured surface 34 is shaped to interface with cover 26.

Cover 26 includes contoured surface 36 and cord notch 38. Contoured surface 36 is shaped to coact with contoured surface 34 to enclose housing 18 and to prevent unintentional contact with electrical power contained therein. Cord notch 38, in the back of cover 26, allows a power cord to egress from the interior of housing 18.

Lower housing 28 includes communication connection opening 40, a clamp interface 42 and a grommet mount hole 44. Communication connection opening 40 allows a communication connector to be snapped into place for access to a fiber optic communications cable (not shown). Clamp interface 42 interacts with clamping device 22 to detachably clamp power/communications module 16 to worksurface 14. Grommet mount hole 44 accommodates an alternative mounting method of power/communications module 16 to worksurface 14 by way of placing a hole in worksurface 14 and clamping power/communications module 16 thereto, through grommet mount hole 44.

Power/communications assembly 20 includes power plug 46, conductors 48, a duplex receptacle 50, and optical splitter assembly 52, an entrance connector 54, interface connectors 56 and optical elements 58. Power plug 46 is electrically connected to conductors 48 thereby powering duplex receptacle 50 and optical splitter assembly 52. Duplex receptacle 50 is fastened to the back side of face plate 24 and aligned such that the power terminals cooperate with power distribution openings 30 to thereby allow a plug to be inserted into power distribution openings 30 and to make electrical contact with duplex outlet 50. Optic elements 58, such as fiber optic cable 58 benefit from being bent as little as possible. A fiber optic cable should normally not be bent sharper than a two inch radius, to preclude damage thereto and to reduce signal attenuation. When routing fiber optic cable 58 within power module 16 connector 54 is directed to connection opening 40 on the back of power module 16 and connectors 56 are directed to openings 32 on an opposite side of power module 16. Additionally, contour 36 of cover 26 allows for sweeping bends if needed in routing fiber optic cables 58. If a fiber optic connection is directed through hole 44 the contours of cover 26 and lower housing 28 work together to allow the fiber optic cable to be routed in power module 16 to connect with optical splitter assembly 52. This advantageously reduces the amount of bending of fiber optic cable 58 in power module 16.

Optical splitter assembly 52 is a signal splitting device that is connected to a bi-directional optic data signal and it splits the signal into multiple bi-directional optic signals. Each of those signals may be further split by other splitter assemblies 52. Optical splitter assembly 52 is passive in nature not requiring power. However, active amplification of signals in optical splitter assembly 52 is also contemplated and to power the amplification, conductors 48 are routed thereto. Optical splitter assembly 52 is mounted to lower housing 28 and positioned so that optical elements 58 are routed to allow connectors 54 and 56 to be, respectively, snapped into communication connection opening 40 and communication connection openings 32. Fiber optic cables connect to entrance connectors 54 also known as ports 54. The bi-directional data signals are transferred by way of ports 54 and 56. Optical splitter assembly 52 functions as a signal concentrator, as well as a splitter, in that it communicates information to/from multiple devices that are connected by way of ports 54 and 56. Port 56 connects to an optic signal receiver/transmitter in a computer or to another optical splitter assembly hub 52. Each optical splitter assembly 52 converts a single attachment port into multiple ports, thereby functioning as an optical hub and effectively supporting the concatenation of multiple hubs.

Clamping device 22 includes L-shaped bracket 60, a clamping bracket 62 and fastener 64. L-shaped bracket 60 interacts with clamp interface 42 to connect clamping device 22 to lower housing 28. Clamping bracket 62 is slidably positioned along L-shaped bracket 60 by way of slot 66. Fastener 64 tightens clamping bracket 62 against L-shaped bracket 60 as a surface of clamping bracket 62 contacts a lower surface of worksurface 14.

Power/communications module 16 is mounted to a worksurface 14 of work center 10 by using clamping device 22. Plug 46 is connected to an electrical outlet, thereby providing power to power/communications module 16. A fiber optic cable (not shown) is connected to entrance connector 54 on the back side of power/communications module 16. The other end of the fiber optic cable is connected to a host or personal computer. Optical splitter assembly 52 provides multiple fiber optics ports on the surface of face plate 24, thereby providing easy access to a user of work center 10 to fiber optic ports 54. Optical splitter assembly 52 expands the number of connections that are available to thereby allow a user the ability to connect multiple optical communications, video, and data devices to the optical system. Power/communications module 16 can be relocated by loosening of clamping device 22 and repositioning of power/communications module 16 on worksurface 14. Alternatively, clamping device 22 may be omitted and power/communications module 16 positioned in any convenient location.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power and communications assembly, comprising:
   a housing removably mountable to a worksurface;
   at least one electrical power receptacle at least partially contained in said housing; and
   an optical splitting device configured to split one optical bi-directional signal into a plurality of additional optical bi-directional signals, said optical splitting device substantially within said housing.

2. The assembly of claim 1, wherein said housing has a contour and said optical splitting device includes at least one fiber optic cable, said fiber optic cable being routed cooperatively with said contour, such that said fiber optic cable is bent so as to not substantially attenuate said bi-directional signal.

3. The assembly of claim 1, wherein said optical splitting device amplifies at least one of said plurality of additional optical bi-directional signals.

4. The assembly of claim 3, wherein said optical splitting device includes a plurality of interface connections.

5. The assembly of claim 4, wherein said housing includes a face surface having at least one connection receiving opening, at least one of said plurality of interface connections being positioned in said connection receiving.

6. The assembly of claim 5, wherein said at least one connection receiving opening is a plurality of connection receiving openings, each of said plurality of connection receiving openings receiving one of a corresponding said plurality of interface connections.

7. The assembly of claim 6, further comprising a clamping mechanism connected to said housing, said clamping mechanism configured to engage a portion of said worksurface.

8. The assembly of claim 7, wherein said housing further comprises an other surface substantially opposite said face surface, said other surface having a connection receiving opening with one of said plurality of interface connections mounted therein.

9. A work center, comprising:

a worksurface; and a power and communications assembly mounted to said worksurface, said power and communications assembly including:

a housing;

at least one electrical power receptacle partially contained in said housing; and an optical splitting device configured to split one optical bi-directional signal into a plurality of additional optical bi-directional signals, said optical splitting device substantially within said housing.

10. The assembly of claim 9, wherein said housing has a contour and said optical splitting device includes at least one fiber optic cable, said fiber optic cable being routed cooperatively with said contour, such that said fiber optic cable is bent so as to not substantially attenuate said bi-directional signal.

11. The assembly of claim 9, wherein said optical splitting device amplifies at least one of said plurality of additional optical bi-directional signals.

12. The assembly of claim 9, wherein said optical splitting device includes a plurality of interface connections.

13. The assembly of claim 12, wherein said housing includes a face surface having at least one connection receiving opening, at least one of said plurality of interface connections being positioned in said connection receiving opening.

14. The assembly of claim 13, wherein said at least one connection receiving opening is a plurality of connection receiving openings, each of said plurality of connection receiving openings receiving one of a corresponding said plurality of interface connections.

15. The assembly of claim 9, further comprising a clamping mechanism connected to said housing, said clamping mechanism configured to engage a portion of said worksurface.

16. A method of expanding a bi-directional signal, comprising the steps of:

combinging substantially within a housing, a power distribution receptacle and an optical signal splitting device;

splitting one bi-directional optical signal connected to said optical splitting device into a plurality of additional bi-directional optical signals; and removably affixing said housing to worksurface.

17. The method of claim 16, further comprising the step of cooperatively routing fiber optic cable with a contour of said housing, such that said fiber optic cable is bent so as to not substantially attenuate said bi-directional optical signal.

18. The method of claim 16, further comprising the step of positioning a plurality of interface connections on a surface of said housing, said interface connections in communication with said optical signal splitting device.

19. The method of claim 16, further comprising the step of clamping said housing to engage a portion of said worksurface.

* * * * *

UNITED STATES PATENT AND TRADEMARK OFFICE
CERTIFICATE OF CORRECTION

PATENT NO. : 6,885,796 B2
DATED : April 26, 2005
INVENTOR(S) : Lubkert et al.

It is certified that error appears in the above-identified patent and that said Letters Patent is hereby corrected as shown below:

Column 1,
Line 47, delete "disable sthe", and substitute -- disables the --;
Line 52, following "is", insert -- a --; and
Line 60, following "thereof,", insert -- a --.

Column 2,
Line 18, delete "drawing", and substitute -- drawings --; and
Line 26, following "to", insert -- a --.

Column 6,
Line 17, following "to", insert -- a --; and
Line 19, following "routing", insert -- a --.

Signed and Sealed this

Fourteenth Day of March, 2006

JON W. DUDAS
*Director of the United States Patent and Trademark Office*